(12) United States Patent
Ramirez Llanos et al.

(10) Patent No.: US 11,995,877 B2
(45) Date of Patent: May 28, 2024

(54) VISUAL TRACKING OF TARGET FEATURES

(71) Applicant: Continental Autonomous Mobility US, LLC, Auburn Hills, MI (US)

(72) Inventors: Eduardo Jose Ramirez Llanos, Rochester, MI (US); Xin Yu, Rochester Hills, MI (US); Matthew Donald Berkemeier, Beverly Hills, MI (US)

(73) Assignee: Continental Autonomous Mobility US, LLC, Auburn Hills, MI (US)

( * ) Notice: Subject to any disclaimer, the term of this patent is extended or adjusted under 35 U.S.C. 154(b) by 116 days.

(21) Appl. No.: 17/645,830

(22) Filed: Dec. 23, 2021

(65) Prior Publication Data

US 2023/0206582 A1    Jun. 29, 2023

(51) Int. Cl.
| | |
|---|---|
| G06V 10/24 | (2022.01) |
| B60R 1/28 | (2022.01) |
| B62D 13/00 | (2006.01) |
| B62D 15/02 | (2006.01) |
| G06V 10/25 | (2022.01) |
| G06V 10/26 | (2022.01) |
| G06V 20/58 | (2022.01) |
| G06V 20/59 | (2022.01) |

(52) U.S. Cl.
CPC ............ G06V 10/245 (2022.01); B60R 1/28 (2022.01); B62D 13/005 (2013.01); B62D 15/0295 (2013.01); G06V 10/25 (2022.01); G06V 10/267 (2022.01); G06V 20/58 (2022.01); G06V 20/59 (2022.01); *G06V 2201/07* (2022.01)

(58) Field of Classification Search
CPC . B60D 1/06; B60D 1/065; B60D 1/01; B60D 1/36; B60D 1/363; B60D 1/62; B60D 1/64; B60R 1/26; B62D 13/005; B62D 13/00; B62D 13/02; B62D 13/025; B62D 13/04; B62D 13/06; B62D 15/0285; B62D 15/028; B62D 15/0295; B62D 15/029; G06T 2207/10016; G06T 2207/30252; G06T 7/246; G06V 10/245; G06V 10/25; G06V 10/255; G06V 10/267; G06V 20/58; G06V 20/588; G06V 20/59; G06V 2201/07; G06V 2201/05; B60W 10/20
USPC ......................................................... 348/148
See application file for complete search history.

(56) References Cited

U.S. PATENT DOCUMENTS

| | | | |
|---|---|---|---|
| 2016/0378118 A1* | 12/2016 | Zeng ........................ | B60D 1/62 701/28 |
| 2019/0335100 A1* | 10/2019 | Chen ........................ | G06T 7/277 |
| 2019/0339708 A1* | 11/2019 | Ramirez Llanos ......................... | B60W 30/18036 |
| 2019/0340787 A1 | 11/2019 | Ramirez Llanos | |

(Continued)

OTHER PUBLICATIONS

The International Search Report and the Written Opinion of the International Searching Authority dated May 3, 3023 for the counterpart PCT Application No. PCT/US2022/082202.

(Continued)

*Primary Examiner* — Nathnael Aynalem

(57) ABSTRACT

A vehicle driver assist system provides for the location of a target feature in an initial image and updates the location of that target feature based on information indicative of vehicle dynamic operation. The system predicts a relative position of the target feature within subsequent images such that only a portion of subsequent images need by analyzed and searched.

21 Claims, 3 Drawing Sheets

(56) References Cited

U.S. PATENT DOCUMENTS

2020/0039517 A1\* 2/2020 Berkemeier ............. B60D 1/06
2021/0264175 A1 8/2021 Zhang

OTHER PUBLICATIONS

Yihong Zhang et al., "Motion-Aware Correlation Filters for Online Visual Tracking", Sensors, Nov. 2018, https://doi.org/10.3390/s18113937.

Martin Danelljan et al., "Discriminative Scale Space Tracking", IEEE Transactions on Pattern Analysis and Machine Intelligence, vol. 39, Issue: 8, pp. 1560-1575, Aug. 1, 2017, DOI: 10.1109/TPAMI.2016.2609928.

Alan Lukezic et al., "Discriminative Correlation Filter with Channel and Spatial Reliability," Proceedings of the IEEE Conference on Computer Vision and Pattern Recognition (CVPR), Jul. 2017, pp. 6309-6318.

\* cited by examiner

VISUAL TRACKING OF TARGET FEATURES

TECHNICAL FIELD

The present disclosure relates to the tracking of target features between images utilized for controlling automated vehicle functions.

BACKGROUND

Vehicles may include automated functions to aid a driver in performing certain tasks, such as for example, parking or hitching a trailer. Vehicle sensors and cameras obtain information about the environment immediately around the vehicle and use that information to guide the vehicle independent of operator control. Once the target feature is found, image processing algorithms are utilized to find and track that feature in subsequent images. Image processing can require significant processing time and capability that can affect driver assist system efficiencies.

The background description provided herein is for the purpose of generally presenting a context of this disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method of tracking a feature relative to a vehicle in a sequence of images according to a disclosed exemplary embodiment includes, among other possible things, identifying a feature within a first image, generating a bounding box around the identified feature, obtaining information indicative of vehicle motion, updating a location of the bounding box in the subsequent images based the information obtained indicative of vehicle motion, providing the location information of the identified feature to an automated driver assist system.

Another exemplary embodiment of the foregoing method further comprises generating the bounding box in subsequent images and searching the bounding box in the subsequent images for the identified feature.

In another exemplary embodiment of any of the foregoing methods, generating the bounding box further comprises using a segmentation routine to generate the initial form of the bounding box.

In another exemplary embodiment of any of the foregoing methods, generating the bounding box further comprises generating dimensions of the bounding box centered on the location of the identified feature.

In another exemplary embodiment of any of the foregoing methods, generating the bounding box further comprises sizing the bounding box around the identified feature according to predefined size based on a size of the identified features within the image in two-dimensions.

In another exemplary embodiment of any of the foregoing methods, updating the location of the bounding box further comprises updating a position of a center of the bounding box within subsequent images.

In another exemplary embodiment of any of the foregoing methods, the information indicative of vehicle motion is comprised of information indicative of relative motion between the vehicle and the identified feature.

In another exemplary embodiment of any of the foregoing methods, the information indicative of vehicle motion includes information indicative of vehicle speed and vehicle direction.

In another exemplary embodiment of any of the foregoing methods, the information indicative of vehicle motion comprises a model that utilizes information indicative of vehicle speed and vehicle direction to determine a predicted relative orientation between the identified feature and the vehicle in subsequent images.

In another exemplary embodiment of any of the foregoing methods, the identified feature comprises a coupler for a trailer and the vehicle includes a hitch and the relative orientation between the identified feature and the vehicle further comprises a relative orientation between the coupler and the hitch.

A driver assist system for a vehicle according to another exemplary embodiment includes, among other possible things, a controller configured to identify a feature within a first image, generate a bounding box around the identified feature, obtain information indicative of vehicle motion, update a location of the bounding box in subsequent images based the information obtained indicative of vehicle motion, and communicate location information of the identified feature to an automated driver assist system.

In another embodiment of the foregoing driver assist system, the controller is further configured to generate dimensions of the bounding box centered on the location of the identified feature.

In another embodiment of any of the foregoing driver assist systems, the information indicative of vehicle motion comprises a model that utilizes information indicative of vehicle speed and vehicle direction to determine a predicted relative orientation between the identified feature and the vehicle in subsequent images.

In another embodiment of any of the foregoing driver assist systems, the identified feature comprises a coupler for a trailer and the vehicle includes a hitch and the relative orientation between the identified feature and the vehicle further comprises a relative orientation between the coupler and the hitch.

Another embodiment of any of the foregoing driver assist systems further includes a camera mounted within the vehicle for generating images and communicating those images to the controller.

In another embodiment of any of the foregoing driver assist systems, the controller is further configured to steer the vehicle toward the identified feature within the first and subsequent images.

In another embodiment of any of the foregoing driver assist systems, updating a location of the bounding box in subsequent images comprises estimating a location of the target feature in a subsequent image based on sensed vehicle movement relative to the target feature within the image.

A computer readable storage medium including instructions for prompting operation of a driver assist system according to another disclosed exemplary embodiment includes, among other possible things, instructions for operating a processor to identify a feature within a first image, instructions for operating the processor to generate a bounding box around the identified feature, instructions for operating the processor to obtain information indicative of vehicle motion, instructions for operating the processor to update a location of the bounding box in subsequent images based the information obtained indicative of vehicle motion and instructions for operating the processor to communicate location information of the identified feature to an automated driver assist system.

Another embodiment of the foregoing computer readable storage medium further includes instructions for operating the processor to generate dimensions of the bounding box centered on the location of the identified feature.

Another embodiment of any of the foregoing computer readable storage mediums further including instructions for operating the processor to steer the vehicle toward the identified feature within the subsequent images.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
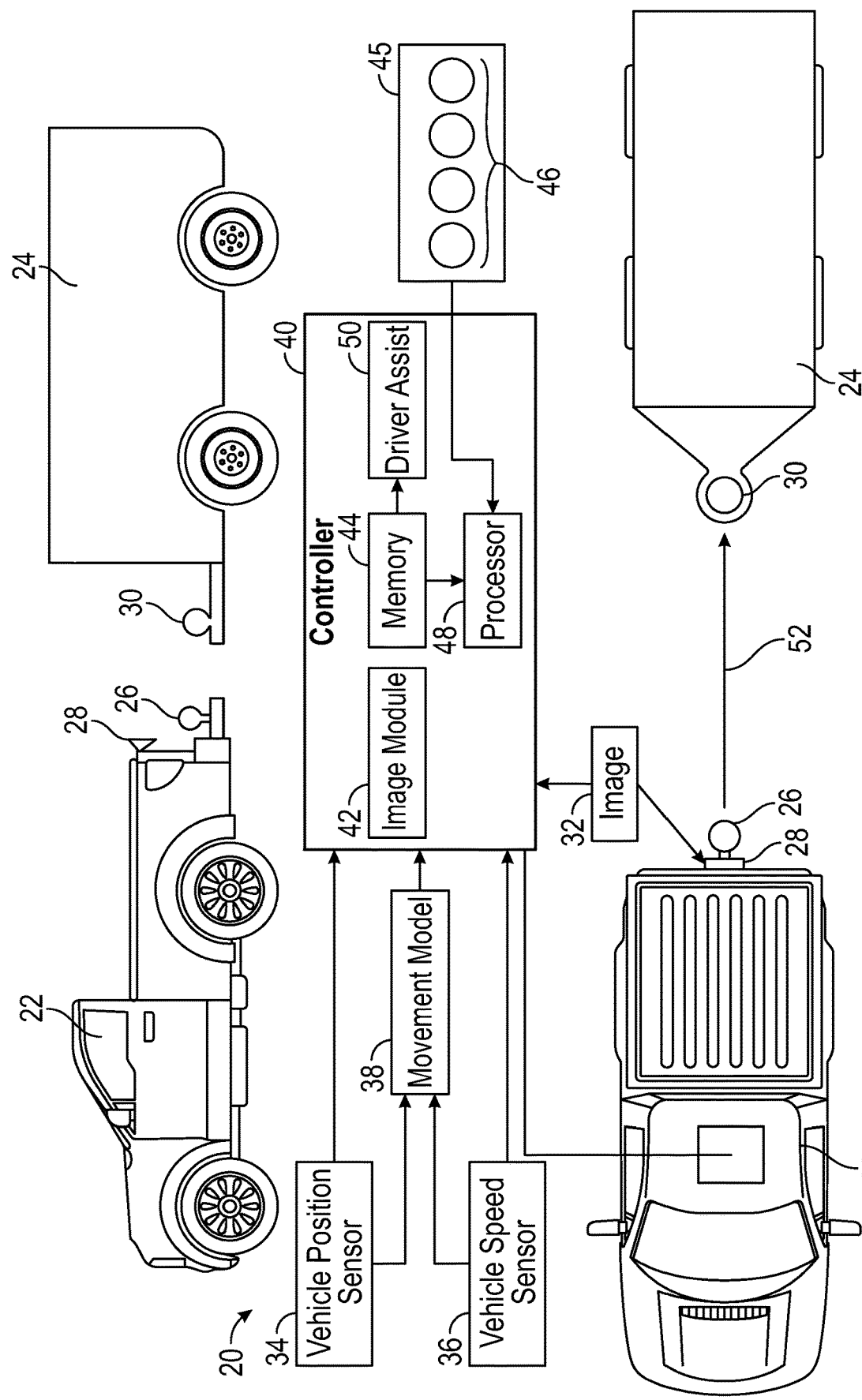
FIG. 1 is a schematic view of an example driver assist system embodiment.

Referring to FIG. 1, a driver assist system 20 is shown schematically for a vehicle 22. In one disclosed example embodiment, the driver assist system 20 guides the vehicle 22 to align a hitch 26 with a coupler 30 of a trailer 24. Alignment of the hitch 26 and coupler 30 is a function of advanced trailer towing features that utilizes images 32 from a rear facing camera 28 to identify and align the coupler 30 with the vehicle hitch 26. The coupler 30 is tracked through the images 32 and used by the system 20 to define a path 52 for the vehicle 22 into alignment with the coupler 30.

The vehicle 22 includes a controller 40 that is configured to identify a target feature, such as the example coupler 30, and track that target feature as the vehicle moves along the path 52. The image 32 is analyzed to identify the coupler 30. Once the coupler 30 is identified, the disclosed system 20 predicts a relative position of the coupler 30 within subsequent images such that only a portion of subsequent images need to be analyzed and searched to again locate the coupler 30. The targeted searching of subsequent images provides faster results that improves operation of the driver assist system 20.

The example controller 40 may be a dedicated controller for the driver assist system 20 or may be part of an overall general vehicle controller. The controller 40 includes a processor 48 that executes software instructions 46 that are stored in a memory device 44. The controller 40 may includes an image processing module 42 and a driver assist module 50. The driver assist module 50 and the image processing module 42 may be embodied as software instructions stored in the memory device 44.

The vehicle 22 includes position sensors 34 and speed sensors 36 that communicate information indicative of vehicle movement and dynamics. The position sensors 34 and speed sensors 36 may be a single sensor or many sensors that are combined to provide information indicative of vehicle movement and operation. In one example embodiment, a movement model 38 is included that uses information from the sensors 34, 36 for predicting a future position of the vehicle 22. Although the sensors 34, 36 and model 38 are disclosed by way of example, other devices and methods that provide information indicative of vehicle movement and dynamics could also be utilized and are within the scope and contemplation of this disclosure.

Figure 2:
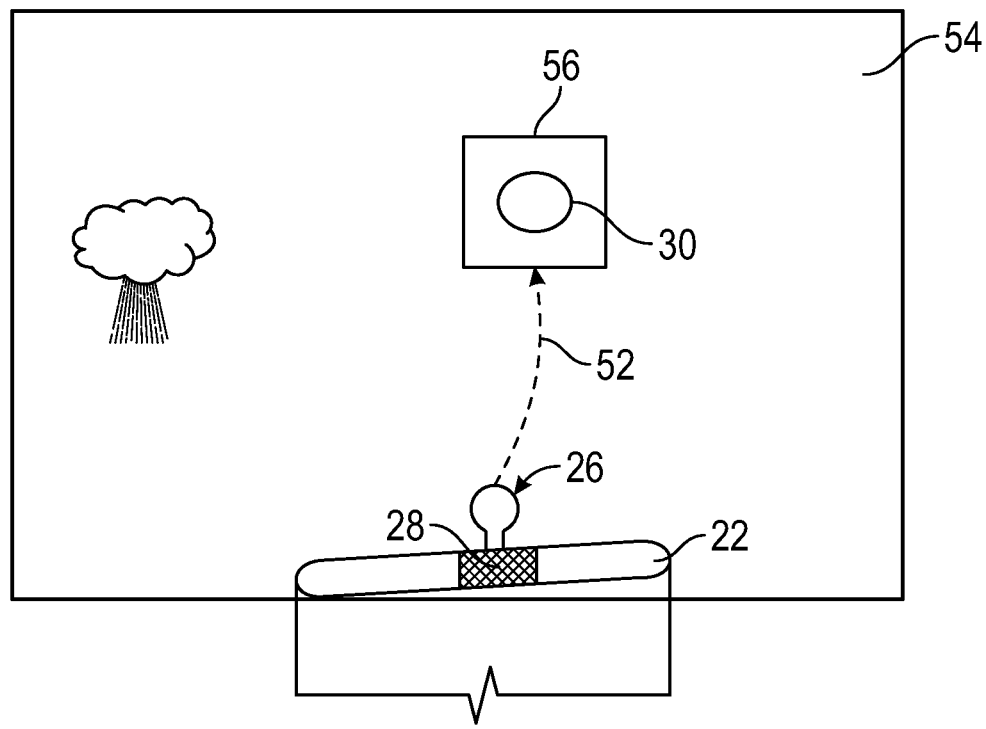
FIG. 2 is a schematic view of an example initial image and generation of an initial bounding box around an identified target feature.

Referring to FIG. 2 with continued reference to FIG. 1, an initial image is schematically shown and indicated at 54. The initial image 54 is scanned to find the target feature such as the coupler 30. As appreciated, although a coupler 30 is disclosed by way of example as the target feature, other objects may be the target feature depending on operation of the driver assist system 20. Such object may include lines on the road or other vehicles utilized to aid in parking the vehicle 22.

The entire image 54 is scanned to find the target feature 30. Scanning of the entire image includes scanning those features such as surrounding vegetation or other objects that are not relevant to operation of the driver assist system 20 for hitching the trailer 24 to the vehicle 22.

Once the target feature 30 is identified, a bounding box 56 is generated around the target feature 30. The bounding box 56 is an analytical construct that narrows the two-dimensional area within the image 54 that is searched for the target feature 30. The initial bounding box 56 is centered on the target feature 30 and is generated to provide a predefined area around the target feature 30. The initial location of the target feature 30 is provided to the driver assist system 20 and used to generate a path 52 to align the coupler 30 and hitch 26 according to one disclosed example. As the vehicle 22 moves relative to the target feature 30, the path 52 is updated based on a change in the relative position between the target feature and the vehicle 22. The change in position is embodied by a two-dimensional change in location in subsequent images.

Figure 3:
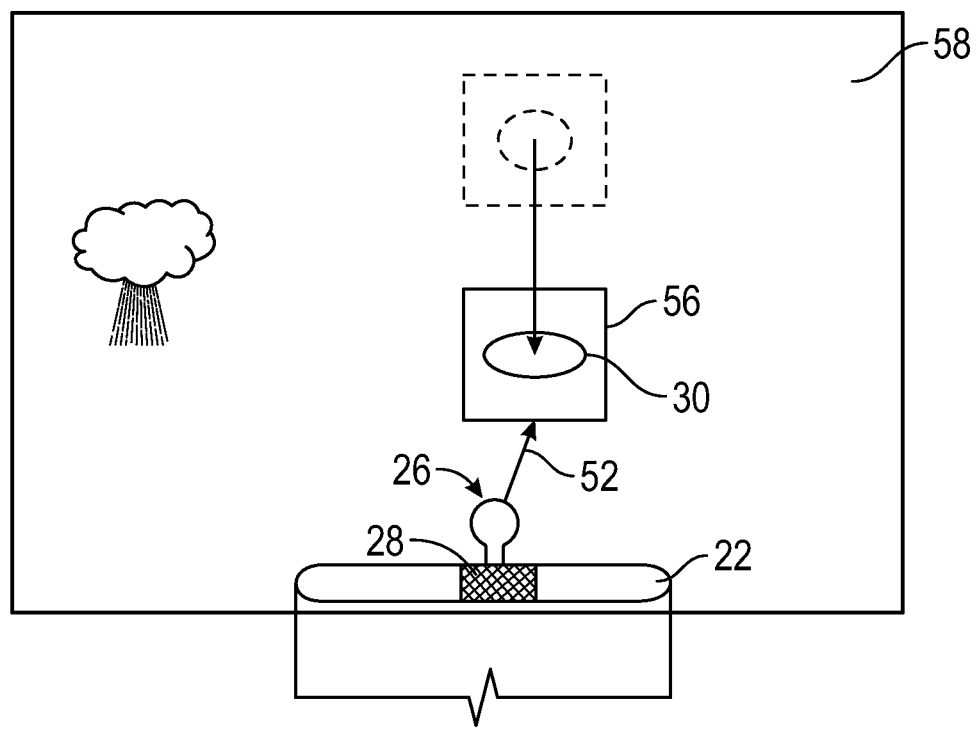
FIG. 3 is a schematic view of an example subsequent image with the position of the bounding box updated based on vehicle dynamics.

Referring to FIG. 3 with continued reference to FIGS. 1 and 2, although in this example the vehicle 22 is moving toward the target feature 30, in subsequent images 58, the target feature 30 appears to move. The movement of the target feature 30 is accounted for by moving the bounding box 56 from the initial location in the initial image 54 to an updated position in the subsequent images 58. Movement of the bounding box 56 corresponds with perceived movement of the target feature 30 within subsequent images 58. Accordingly, the position of the bounding box 56 in subsequent images 58 is updated such that the target feature 30 remains within the bounding box 56.

In this disclosed example, the position of the bounding box 56 is updated based on information indicative of vehicle movement and dynamics. As should be appreciated, vehicle movement and dynamics corresponds with movement of the camera 28. Relative movement between the camera 28 and the target feature 30 is shown in subsequent images as movement of the target feature 30. The location of the target feature 30 is updated with each subsequent image and found in the updated location of the bounding box 56. The example image processing module 42 provides for updating the location the bounding box 56 by using information indicative of vehicle dynamics provided by the sensors 34, 36 and/or the movement model 38.

Movement of the bounding box 56 within subsequent images is provided by image processing features executed according to the software instructions 46 stored in the memory device 44.

In one disclosed example, the image processing module 42 operates with the input of a series of images 32 from the camera 28 and an initial location of the bounding box 56. The initial location of the bounding box 56 is provided by an image segmentation process. Image segmentation is a process that partitions a digital image into segments to simplify the image and provide for analysis of features within the image. Image segmentation provides for the location of the target feature and for the generation of the initial bounding box around the target feature. Image segmentation can be performed on the initial image 54 according to any known segmentation method and process.

Once the bounding box 56 is generated in the initial image 54, the location of the bounding box 56 is updated using vehicle dynamic information to determine a predicted position of the bounding box 56 in subsequent images 58. The vehicle dynamics is provided with a movement model 38. Accordingly, segmentation processing is not used on subsequent images 58. By not using segmentation processing on subsequent images 58, processing time can be significantly reduced to aid in real time operation of the driver assist system 20.

The vehicle dynamics as provided by the sensors 34, 36 and/or the movement model 38 are used as long as confidence level that such information is providing accurate information. When a confidence level degrades such that the movement model 38 is not providing sufficient accuracy, the segmentation process can be performed again to provide an initial location of the target features and of the bounding box 56. The reinitialization of the location of the target object 30 and the bounding box 56 enables use of the movement model 38 for subsequent images 58.

The example method is executed according to software instructions 46 saved in the memory device 44. In one disclosed embodiment, the software instructions 46 execute the example method.

The example operation is embodied as an algorithm that finds the filter $h_d \epsilon R^{l \times n}$ that minimizes the optimization problem where l and n are the training/search region width and height, respectively. The filter is represented mathematically by Equation 1 below.

$$\min_h \sum_{d=1}^{N} w_d |f_d \star h_d \odot m - g|^2 + \lambda \sum_{d=1}^{N} |h_d|^2, \qquad \text{Equation 1}$$

Where:
d=1, . . . , N represents the number of features;
$w_d$ is a weight factor:
$f_d \epsilon R^{l \times n}$ is the extracted features, $h_d \epsilon R^{l \times n}$ is the optimization variable (filter);
⋆ is the convolution operator;
⊙ is the element-wise matrix product;
$m \epsilon [0,1]^{l \times n}$ is a mask,
$g \epsilon R^{l \times n}$ is the desired output response chosen as a 2-D Gaussian function centered at the target location; and
λ is a regularizing term.

The disclosed example method may be embodied by a sequence of steps related in view of equation 1. A first step is to obtain an initial bounding box 56 as is shown in FIG. 2. The regularizing term A is them initialized. The features $f_d$ for d=1, . . . , N are extracted followed by initializing g as a 2-D Gaussian function centered on the target feature 30.

The mask m is then set as to "1" if a confidence level of the movement model 38 is low. The "1" indicates that the motion estimation is not used in this step. If the confidence level of the movement model is already seeded on the target feature 30, then the movement model 38 is utilized. Once these steps are taken for this example embodiment, the location of the bounding box 56 is determined and the process repeated for subsequent images. The position of the mask m is then further updated using the movement model 38 and/or other information indicative of relative motion between the vehicle and target feature. As appreciated, movement is represented by a change in the two-dimensional position of the target feature 30 within the subsequent images 58. The position of the mask m is updated by using the motion estimation projected in the 2-D image and the last target location.

Figure 4:
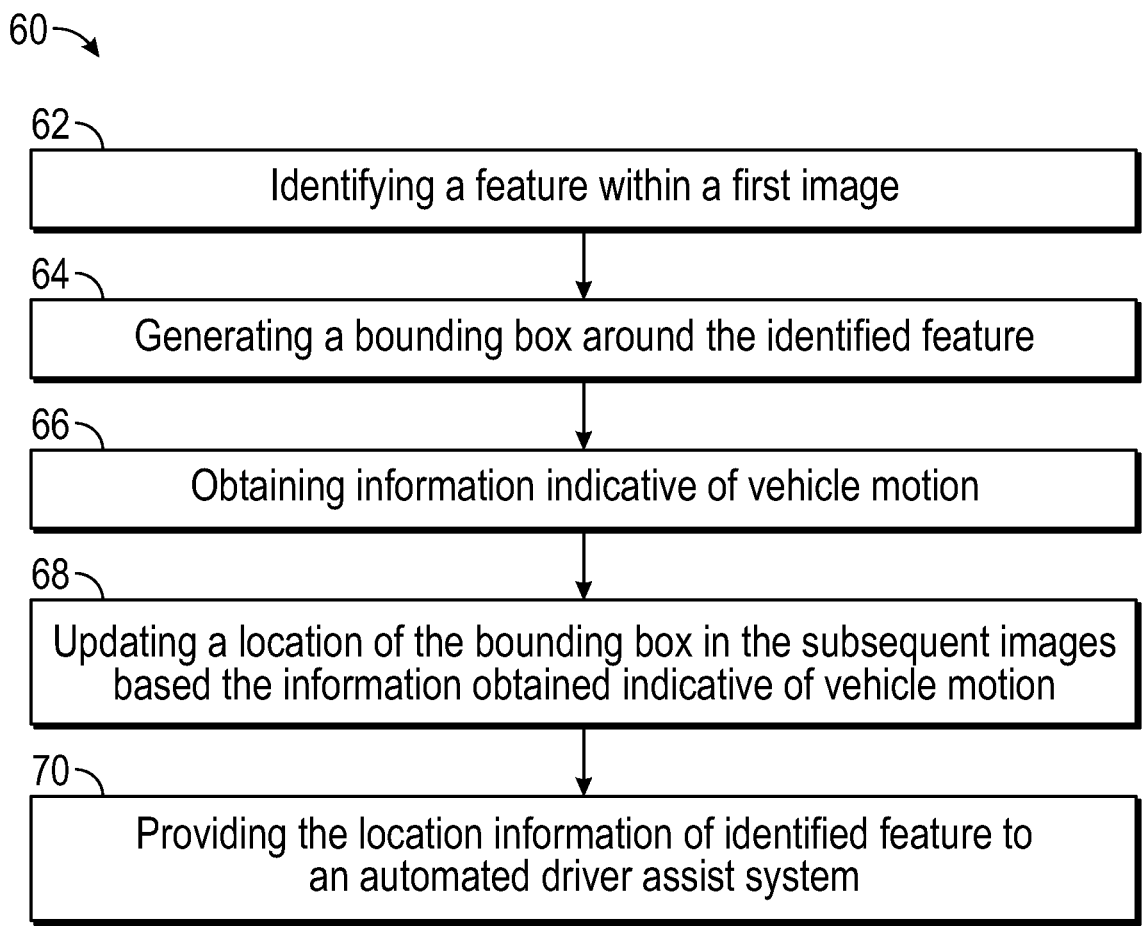
FIG. 4 is a flow diagram of an example method of forming and updating a position of a bounding box around a target feature within images utilized by a driver assist system.

Referring to FIG. 4, an embodiment of an example disclosed process is schematically indicated by flow chart 60 and includes the initial step of identifying a target feature 30 within a first image 54 (FIG. 2) as is indicated at 62. Identification of the target feature 30 may be performed utilizing any known image processing and analysis process. In one disclosed embodiment, a segmentation process is utilized on the initial image 54. The segmentation process partitions a digital image into segments to simplify the image and provide for analysis of features within the image. Any known segmentation process can be used within the contemplation and scope of this disclosure. The segmentation process if further utilized to construct an initial bounding box 56 around the target feature 30 in the first image 54 as is indicated at 64 in the flow diagram of FIG. 4.

It should be appreciated, that the term first image refers to that image that the segmentation process is utilized to find the target feature 30 and then construct the bounding box 56 around that target feature. The first image 54 may be any image that the segmentation process is utilized in an embodiment of the disclosed process. At any time during a driver assist maneuver, the system 20 may reset the location of the target feature 30 and bounding box 56 with a segmentation process.

Once the target feature 30 and bounding box 56 are located within the first image 54, movement is tracked utilizing predicted vehicle movement rather than another segmentation process as is indicated at 66. As appreciated, the movement that appears in the subsequent images 58 is the result of movement of the vehicle 22. The target feature, in this example, the trailer coupler 30 is stationary. However, the relative movement perceived in subsequent images 58 is of the target feature 30 moving relative to the vehicle 22.

The location of the bounding box 56 within the two-dimensional space of subsequent images 58 is updated using information indicative of vehicle movement as indicated at 68. The information indicative of vehicle movement is provided in one example embodiment by the sensors 34, 36 and/or the movement model 38. Other methods and devices could be utilized to communicate vehicle dynamics and movement within the scope and contemplation of this disclosure. The updated location of the bounding box 56 is utilized to locate and track the target feature, coupler 30. Rather than search each image for the target feature 30, the bounding box 56 limits the search to a predicted area based on a previous position of the vehicle combined with the predicted path and movement of the vehicle 22.

Once the target feature 30 is located in the image, that location information is communicated to and utilized by the driver assist system 20 to update the path 52 (FIG. 3) as is indicated at 70. The path 52 in this example is to align the vehicle hitch 26 with the trailer coupling 30. The driver assist system 20 uses the updated information provided in the subsequent images 58 to continually updated the path 52 until the desired alignment is obtained.

It should be appreciated, that although a disclosed example includes alignment between at trailer coupling 30 and a vehicle hitch 26, other driver assist processes for autonomously or semi-autonomously moving a vehicle that rely on identification of a target feature within a series of images would be recognized as being within the contemplation and scope of this disclosure.

The software instructions 46 for configuring and operating the controller 40 and the processor 48 are embodied in software instructions that are stored on a computer readable medium schematically indicated at 45 in FIG. 1. The computer readable medium may be embodied in structures such as, but is not limited to, any type of disk including floppy disks, optical disks, CD-ROMs, magnetic-optical disks, read-only memories (ROMs), random access memories (RAMS), EPROMs, EEPROMs, magnetic or optical cards, application specific integrated circuits (ASICs), or any type of media suitable for storing electronic instructions, and each coupled to a computer system bus. The disclosed computer readable medium may be a non-transitory medium such as those examples provided.

Moreover, the software instructions 46 may be saved in the memory 44. The disclosed memory device 44, may can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). The software in the memory may include one or more separate programs, each of which includes an ordered listing of executable instructions for implementing logical functions. The controller 40 can be configured to execute software stored within the memory, to communicate data to and from the memory, and to generally control operations of the computing device pursuant to the software. Software in memory, in whole or in part, is read by the processor, perhaps buffered within the processor, and then executed.

Accordingly, the disclosed driver assist system uses information indicative of vehicle dynamics to update the predicted location of a target feature in subsequent images to provide increased efficiencies.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method of tracking a feature relative to a vehicle in a sequence of images comprising:
identifying, by a processor, a feature within a first image;
generating, by the processor, a bounding box around the identified feature;
obtaining, by the processor, information indicative of vehicle motion;
determining, by the processor, a level of confidence in an accuracy of the information indicative of vehicle motion, updating a location of the bounding box in at least one subsequent image using a segmentation routine if the level of confidence indicates the information indicative of vehicle motion is not accurate, and updating the location of the bounding box in the at least one subsequent image using the information obtained indicative of vehicle motion if the level of confidence indicates the information indicative of vehicle motion is accurate;
providing, by the processor, location information of the identified feature to an automated driver assist system.

2. The method as recited in claim 1, further comprising generating, by the processor, the bounding box in the at least one subsequent image and searching within the bounding box in the at least one subsequent image for the identified feature.

3. The method as recited in claim 1, wherein generating the bounding box further comprises using the segmentation routine to generate an initial bounding box within the first image.

4. The method as recited in claim 1, wherein generating the bounding box further comprises generating, by the processor, dimensions of the bounding box centered on location of the identified feature.

5. The method as recited in claim 1, wherein generating the bounding box further comprises sizing, by the processor, the bounding box around the identified feature according to predefined size based on a size of the identified features within the image in two-dimensions.

6. The method as recited in claim 1, wherein updating the location of the bounding box further comprises updating, by the processor, a position of a center of the bounding box within the at least one subsequent image.

7. The method as recited in claim 1, wherein the information indicative of vehicle motion is comprised of information indicative of relative motion between the vehicle and the identified feature.

8. The method as recited in claim 7, wherein the information indicative of vehicle motion includes information indicative of vehicle speed and vehicle direction.

9. The method as recited in claim 1, wherein the information indicative of vehicle motion comprises a model that utilizes information indicative of vehicle speed and vehicle direction to determine a predicted relative orientation between the identified feature and the vehicle in subsequent images.

10. The method as recited in claim 1, wherein the identified feature comprises a coupler for a trailer and the vehicle includes a hitch and the relative orientation between the identified feature and the vehicle further comprises a relative orientation between the coupler and the hitch.

11. The method as recited in claim 1, wherein updating the location of the bounding box in the at least one subsequent image comprises performing a minimization $$\min_h \sum_{d=1}^{N} w_d |f_d * h_d \odot m - g|^2 + \lambda \sum_{d=1}^{N} |h_d|^2,$$

wherein d=1, . . . , N represents a number of identified features, $w_d$ is a weight factor, $f_d \in R^{l \times n}$ are extracted identified features including the identified feature, $h_d \in R^{l \times n}$ is an optimization variable, * is a convolution operator, ⊙ is an element-wise matrix product, $m \in [0,1]^{l \times n}$ is a mask, $g \in R^{l \times n}$ is a desired output response chosen as a 2-D Gaussian function centered at a target location, and λ is a regularizing term.

12. A driver assist system for a vehicle comprising:
a controller comprising a processor configured to:
   identify a feature within a first image;
   generate a bounding box around the identified feature;
   obtain information indicative of vehicle motion;
   determine a level of confidence in an accuracy of the information indicative of vehicle motion, updating the location of the bounding box in at least one subsequent image using a segmentation routine if the level of confidence indicates the information indicative of vehicle motion is not accurate, and updating the location of the bounding box in the at least one subsequent image using the information obtained indicative of vehicle motion if the level of confidence indicates the information indicative of vehicle motion is accurate; and
   communicate location information of the identified feature to an automated driver assist system.

13. The driver assist system as recited in claim 12, wherein the controller processor is further configured to generate dimensions of the bounding box centered on the location of the identified feature.

14. The driver assist system as recited in claim 13, the information indicative of vehicle motion comprises a model that utilizes information indicative of vehicle speed and vehicle direction to determine a predicted relative orientation between the identified feature and the vehicle in subsequent image.

15. The driver assist system as recited in claim 12, wherein the identified feature comprises a coupler for a trailer and the vehicle includes a hitch and the relative orientation between the identified feature and the vehicle further comprises a relative orientation between the coupler and the hitch.

16. The driver assist system as recited in claim 12, further comprising a camera mounted within the vehicle for generating images and communicating those images to the controller.

17. The driver assist system as recited in claim 12, wherein the controller processor is further configured to steer the vehicle toward the identified feature within the first and subsequent images.

18. The driver assist system as recited in claim 12, wherein updating a location of the bounding box in the at least one subsequent image comprises estimating a location of the identified feature in the at least one subsequent image based on sensed vehicle movement relative to the identified feature within the image.

19. A non-transitory computer readable storage medium including instructions for prompting operation of a driver assist system, the non-transitory computer readable storage medium including instructions comprising:
   instructions for operating a processor to identify a feature within a first image;
   instructions for operating the processor to generate a bounding box around the identified feature;
   instructions for operating the processor to obtain information indicative of vehicle motion;
   instructions for determining a level of confidence in an accuracy of the information indicative of vehicle motion, updating the location of the bonding box in at least one subsequent image using a segmentation routine if the level of confidence indicates the information indicative of vehicle motion is not accurate, and updating the location of the bounding box in the at least one subsequent image using the information obtained indicative of vehicle motion if the level of confidence indicates the information indicative of vehicle motion is accurate; and
   instructions for operating the processor to communicate location information of the identified feature to an automated driver assist system.

20. The computer readable storage medium as recited in claim 19, further including instructions for operating the processor to generate dimensions of the bounding box centered on the location of the identified feature.

21. The computer readable storage medium as recited in claim 20, further including instructions for operating the processor to steer the vehicle toward the identified feature within the at least one subsequent image.

* * * * *